US012705893B2

(12) United States Patent
Iyengar et al.

(10) Patent No.: US 12,705,893 B2
(45) Date of Patent: Aug. 11, 2026

(54) ARTIFICIALLY INTELLIGENT SPORTS COMPANION DEVICE

(71) Applicant: RN CHIDAKASHI TECHNOLOGIES PRIVATE LIMITED, Mumbai (IN)

(72) Inventors: Prashant Iyengar, Mumbai (IN); Hardik Godara, Jodhpur (IN)

(73) Assignee: RN CHIDAKASHI TECHNOLOGIES PRIVATE LIMITED, Mumbai (IN)

( * ) Notice: Subject to any disclaimer, the term of this patent is extended or adjusted under 35 U.S.C. 154(b) by 370 days.

(21) Appl. No.: 18/282,531

(22) PCT Filed: Mar. 19, 2022

(86) PCT No.: PCT/IN2022/050270
§ 371 (c)(1),
(2) Date: Sep. 17, 2023

(87) PCT Pub. No.: WO2022/201186
PCT Pub. Date: Sep. 29, 2022

(65) Prior Publication Data
US 2024/0144684 A1 May 2, 2024

(30) Foreign Application Priority Data
Mar. 20, 2021 (IN) ............................ 202121011970

(51) Int. Cl.
*G06V 20/40* (2022.01)
*B25J 11/00* (2006.01)

(52) U.S. Cl.
CPC ............ *G06V 20/44* (2022.01); *B25J 11/001* (2013.01)

(58) Field of Classification Search
None
See application file for complete search history.

(56) References Cited

U.S. PATENT DOCUMENTS

2019/0206402 A1* 7/2019 Shukla .................... G06F 3/011
2020/0380389 A1* 12/2020 Eldeeb .................. G06F 40/284

OTHER PUBLICATIONS

ÂWorld-Class Lessons on AI in Marketing—Cannes Lions x Kurio—2018—Cover.â Kurio, https://kurio.fi/v2/wp-content/uploads/2018/11/World-Class-Lessons-on-AI-in-Marketing-Cannes-Lions-x-Kurio-2018-cover.jpg. Nov. 2018. (Year: 2018).*

(Continued)

*Primary Examiner* — Matthew C Bella
*Assistant Examiner* — Johnny B Duong

(57) ABSTRACT

The embodiments herein relates to an artificially intelligent sports companion device 100 for accompanying an user 102 during events and activities. The artificially intelligent sports companion device 100 includes an event capture module 104, a processor 106, a knowledge database 108, and an output module 110. The processor 106 is configured to acquire at least one of the activity or the event along with the user 102 with the event capture module 104, semantic information from the user 102 and form opinions for conversation, and store audio/video feed of the activity or the event and the opinions in the knowledge database 108 to understand user preferences. The processor 106 of the artificially intelligent sports companion device 100 is configured to interact with the user 102 by understanding the user preferences through the output module 110 with an audio/video or through one or more expressions.

9 Claims, 8 Drawing Sheets

(56) References Cited

OTHER PUBLICATIONS

Shukla, Pushkar, et al. "Automatic cricket highlight generation using event-driven and excitement-based features." Proceedings of the IEEE conference on computer vision and pattern recognition workshops. 2018. (Year: 2018).*

Dodge, Amanda. âSports and Robotics: How Robots Are Changing the Game.â Ozobot, Sep. 4, 2018, https://ozobot.com/bots-on-the-field-the-future-of-sports-and-robotics/. (Year: 2018).*

Wang, Shangfei, and Qiang Ji. "Video affective content analysis: A survey of state-of-the-art methods." IEEE Transactions on Affective Computing 6.4 (2015): 410-430. (Year: 2015).*

Steunebrink, Bas R., et al. "A Generic Architecture for a Companion Robot." ICINCO-RA (2). 2008. (Year: 2008).*

* cited by examiner

ARTIFICIALLY INTELLIGENT SPORTS COMPANION DEVICE

BACKGROUND

Technical Field

The embodiments herein generally relate to artificial intelligence and robotics, more particularly to an Artificially Intelligent (AI) companion device for providing companionship to a human being or group of human beings for physical and/or digital sports related activities and events.

Description of the Related Art

With developments in Artificial Intelligence (AI), machines and devices, including robots are capable of performing human like roles, including processing voice inputs, engaging in conversation, and processing sensory inputs to determine emotions of human beings. Such artificially intelligent devices have applications spanning not only performing routine activities, but also in education. When emotional intelligence is added to artificial intelligence, such devices are capable of providing companionship to human beings.

At times when there are restrictions in travelling, interacting with other human beings, and attending events such as sporting events becomes a challenge. Although entertainment options like watching movies or playing video games are available to users within the comfort of their homes, they do not compare to the excitement of experiencing live sporting events along with friends who share a common interest in the sport.

Accordingly, there remains a need for using technology and devices to enable human beings who are fans of sports to be able to experience sporting events and activities along with companionship, even when human companions are unavailable or inaccessible and experience live sporting events with help of sports companion device.

SUMMARY

An embodiment herein provides an artificially intelligent sports companion device including a memory and a processor. The memory store instructions. The processor executes the instructions and is configured to (i) capture at least one of at least one event or activity, experiences of the user, and activities of players, (ii) detect milestones when there is any of a rise, a drop or a change in the captured event or activity, (iii) determine reactions based on the detected milestones, (iv) express the determined reaction with one or more robot actuators, (v) obtain at least one of semantic information from the user and an information about the event or activity from the user using an output unit, and audio/video feeds relevant to the at least one event or activity from a knowledge database, (vi) determine conversations about at least one event or activity by aggregating at least one of the semantic information from the user, the information about the event or activity from the user, and the audio/video feeds relevant to the at least one event or activity from the knowledge database, to enable companionship to the user, and (vii) communicate, using the output unit, the conversations to the user through one or more expressions that enables the user to experience at least one event or activity, even when human companions are not available.

In some embodiments, the milestones include any of goals being scored, a team winning or losing a match, wickets gone, or centuries scored.

In some embodiments, the reactions include any of audio/video expression for cheer, audio/video expression for applause, illumination lights, audio/video expression for disappointment, or audio/video expression for anger, based on the detected milestones in the captured event or activity.

In some embodiments, the processor is configured to store audio/video feeds of the one or more events in the knowledge database.

In some embodiments, the processor is configured to: (i) observe a viewing pattern of the user along with sentiment and behaviour exhibited by the user, (ii) classify the sentiment exhibited by the user, where the classification includes any of a positive sentiment or a negative sentiment, and (iii) save the positive sentiment and the negative sentiment in the knowledge database.

In some embodiments, the processor is configured to (i) measure grades of the user based on the user's measure of liking any of a sport, a team, or the players, wherein the grades are calculated based on contents viewed, users time spent on the activity, and sentiments expressed during the one or more events or activities, and (ii) generate the reactions with varying sentiments in different durations to different activities, based on the grades of the user.

In some embodiments, the processor is configured to (i) interact the conversations and acquires the information from the user on teams or players, (ii) enable the one or more robot actuators for communicating the conversations to the user through the one or more expressions, wherein the artificially intelligent sports companion device is integrated with a social media engine that captures the reactions of the user while viewing the at least one event or activity and sort out key visuals. The social media engine is configured to summarize the key visuals of the at least one event or activity, with social media platform requirements, and share them in one or more platforms.

In some embodiments, the processor is configured to (i) acquire or capture at least one of the activity or the event along with the user, (ii) create memories of at least one of the activity or the event along with the user, (iii) create memories of a viewing experience; and (iv) generate opinions for conversation with the user.

In an aspect, an embodiment herein provides an artificially intelligent sports companion device including an event capture module, an event milestone detection module, a reaction detection module, an acquaintance expression generation module, a memory, and a processor. The event capture module is configured to capture at least one of at least one event or activity, experiences of a user, and activities of players. The event milestone detection module is configured to detect milestones when there is any of a rise, a drop, or a change in the captured event or activity. The reaction detection module is configured to determine reactions based on the detected milestones. The acquaintance expression generation module is configured to express the determined reactions with one or more robot actuators. The memory is configured to store instructions. The processor is configured to execute the instructions and is configured to (i) obtain at least one of semantic information from the user and information about the event or the activity from the user using an output unit, and audio/video feeds relevant to the at least one event or activity from a knowledge database, (ii) determine conversations about at least one event or activity by aggregating at least one of the semantic information from the user, the information about the event or activity from the user, and the audio/video feeds relevant to the at least one event or activity from the knowledge database, to enable companionship to the user, and (iii) communicate, using the output unit, the conversations to the user through one or more expressions that enables the user to experience at least one event or activity, even when human companions are not available.

In an aspect, an embodiment herein provides a method for enabling a user to experience at least one event or activity, even when human companions are not available. The method includes (i) capturing at least one of at least one event or activity, experiences of the user, and activities of players, (ii) detecting milestones when there is any of a rise, a drop, or a change in the captured event or activity, (iii) determining reactions based on the detected milestones, (iv) expressing the determined reaction with one or more robot actuators, (v) expressing the determined reaction with one or more robot actuators, (vi) obtaining at least one of semantic information from the user and an information about the event or activity from the user using an output unit, and audio/video feeds relevant to the at least one event or activity from a knowledge database, (vii) determining conversations about at least one event or activity by aggregating at least one of the semantic information from the user, the information about the event or activity from the user, and the audio/video feeds relevant to the at least one event or activity from the knowledge database, to enable companionship to the user, and (viii) communicating, using the output unit, the conversations to the user through one or more expressions that enables the user to experience at least one event or activity, even when human companions are not available.

The artificially intelligent sports companion device is a portable/body-held digital device or an anthropomorphic device. The artificially intelligent sports companion device acquires information about the at least one event or activity from a user's point of view and aggregates all information to determine conversations, which enables the artificially intelligent sports companion device to accompany the user emotionally.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
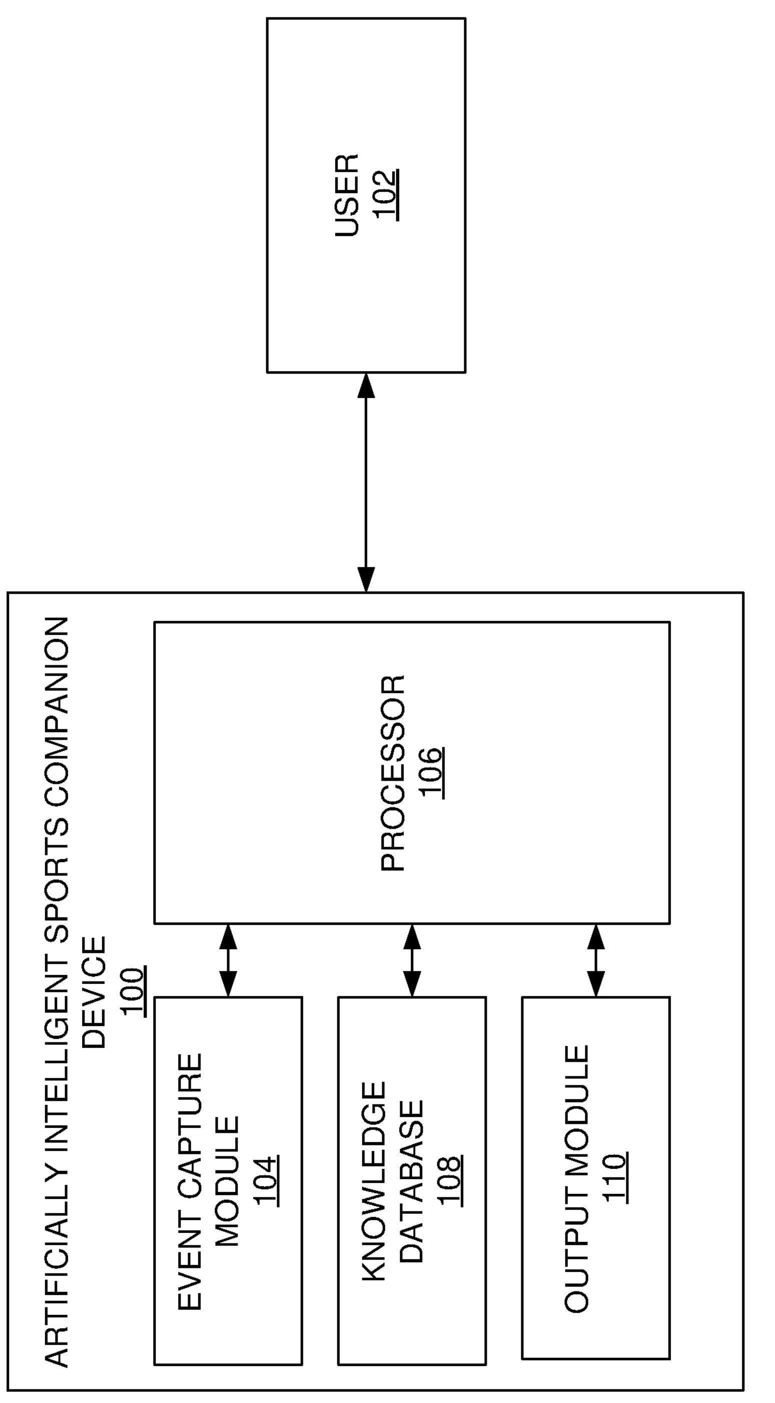
FIG. 1 illustrates a system view of an artificially intelligent sports companion device to accompany a user during one or more events according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for using technology and devices to enable human beings who are fans of sports to be able to experience sporting events and activities along with companionship, even when human companions are unavailable or inaccessible and experience live sporting events with help of sports companion device. Referring now to the drawings, and more particularly to FIGS. 1 through 8, where similar reference characters denote corresponding features consistently throughout the figures, preferred embodiments are shown.

FIG. 1 illustrates a system view of an artificially intelligent sports companion device 100 to accompany a user 102 during one or more events according to some embodiments herein. The system view includes the artificially intelligent sports companion device 100, and the user 102. The artificially intelligent sports companion device 100 accompanies the user 102 during one or more events. In some embodiments, the artificially intelligent sports companion device 100 can accompany one or more users during the one or more events. The one or more events may be at least one of a sport event or a sport activity. In some embodiments, the at least one of the sport event or the sport activity can accompany the user 102 or the one or more users during a digital sporting activity or a physical sporting activity. In some embodiments, the sports event or the sports activity can be the sports event or activity the user 102 participating in. The artificially intelligent sports companion device 100 includes an event capture module 104, a processor 106, a knowledge database 108, and an output module 110. The artificially intelligent sports companion device 100 may be a wearable device. In some embodiments, the artificially intelligent sports companion device 100 consists of various hardware modules and interfaces integrated with a mindful module and can be modelled as either a portable/body held digital device or an anthropomorphic device. In some embodiments, the artificially intelligent sports companion device 100 includes a memory to store instructions. The processor 106 may execute the instructions to provide companionship to the user 102. The output module 110 may be an output unit.

Figure 2:
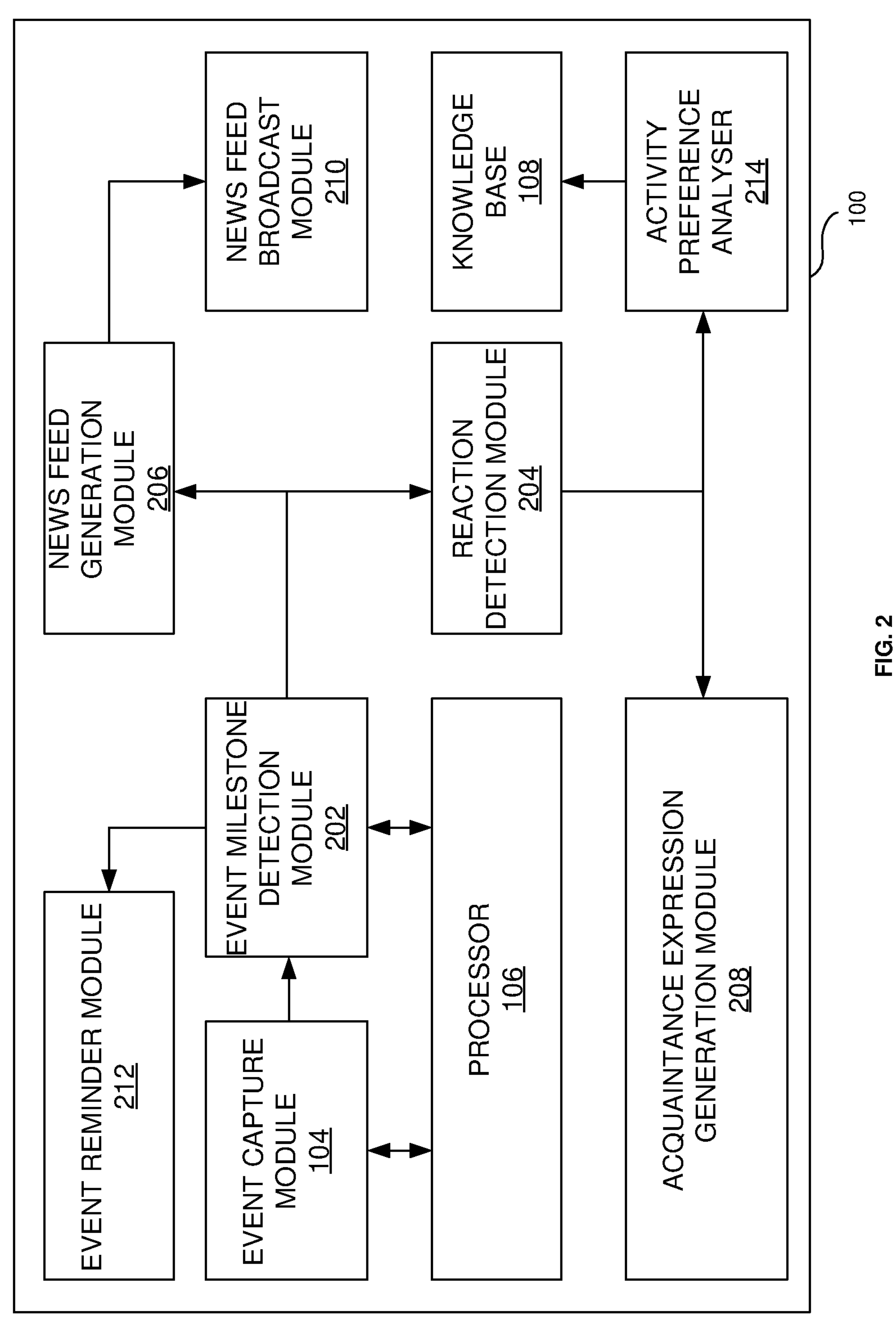
FIG. 2 illustrates a block diagram of the artificially intelligent sports companion device according to some embodiments herein.

FIG. 2 illustrates a block diagram of the artificially intelligent sports companion device 100 according to some embodiments herein. The artificially intelligent sports companion device 100 includes the event capture module 104, the processor 106, an event milestone detection module 202, a reaction detection module 204, a news feed generation module 206, an acquaintance expression generation module 208, a news feed broadcast module 210, an event reminder module 212, an activity preference analyser 214 and the knowledge database 108. The event capture module 104 capture at least one of the event and the processor 106 enables the event milestone detection module 202 to detect milestones in the captured event. The milestones may be any of goals being scored, the team winning or losing a match, wickets gone, centuries scored, and the like.

The processor 106 enables the reaction detection module 204 to determine reactions when the event milestone detection module 202 detects the milestones. In some embodiments, the reactions can be any of audio/video expression for cheer, audio/video expression for applause, illumination lights, audio/video expression for disappointment, or audio/video expression for anger. In some embodiments, degrees of emotion can be determined by any of audio, video or textual information captured by the reaction detection module 204 while the user 102 exhibiting the reaction. The processor 106 is configured to generate the determined reaction in the artificially intelligent sports companion device 100 using the acquaintance expression generation module 208. The artificially intelligent sports companion device 100 observes the viewing pattern of the user 102 along with sentiment and behavior exhibited by the user 102 during the event. In some embodiments, the reaction detection module 204 identifies the reaction along with the sentiment exhibited by the user 102 during the event and correlates it with the sport, the team, or the player. The reaction detection module 204 may classify the sentiment exhibited by the user 102. In some embodiments, the classification can be any of a positive sentiment or a negative sentiment. The processor 106 is configured to save the classified sentiments in the knowledge database 108. The activity preference analyser 214 uses the identified reaction as inputs to predict the user preferences. The predicted user preferences may be saved in the knowledge database 108.

The artificially intelligent sports companion device 100 may include a sort module to measure grades of the user 102 based on users measure of liking any of the sport, the team or the players are calculated based on contents viewed, users time spent on the activity, and sentiments expressed. In some embodiments, different grades can be assigned to different teams, players and sport. Based on the grades, activities are sorted and the artificially intelligent sports companion device 100 expresses varying sentiments with different durations to different activities preferred by the user 102.

In some embodiments, the artificially intelligent sports companion device functions in the news mode to 100 relays daily news updates relating to at least one event based on user preference and personalization. The user preference may be changed by changing the opinions of the event by the user 102. In some embodiments, the artificially intelligent sports companion device 100 can relay past news feeds in a news mode related to at least one of event on user preference and personalization. In some embodiments, the processor 106 enables the news feed generation module 206 to generate the news feed from plurality of new sources when the artificially intelligent sports companion device 100 acquires news mode. The news feed may be from the knowledge database 108 or one or more news sources. In some embodiments, the news feed can be from any of the semantic information of the user 102, or an event audio visual input. The processor 106 enables the news feed broadcast module 210 to broadcast the news feed or system generated news feed to the user 102. In some embodiments, the broadcast can be any of video news feeds, audio news feeds or text news feeds.

The event capture module 104 acquires at least one of the activity or the event along with the user 102, create memories of at least one of the activity or the event along with the user 102, create memories of a viewing experience, and form opinions for conversation. In some embodiments, the event capture module 104 creates memories of a sport viewing experience. In some embodiments, the event capture module 104 form opinions for sport conversation with the user 102. The event capture module 104 may also capture experiences of the one or more users and share with the user 102, capture activities from perspective of players and share with the user 102, and monetize the sport viewing experience. The knowledge database 108 stores audio/video feeds of the events. The knowledge database 108 may be a sport information knowledge database 108 that includes feed relevant to sport events. The audio/video feeds may be relevant to sport events. In some embodiments, the audio/video feed can be obtained from a server.

The processor 106 is configured to obtain semantic information from the user 102 and audio/video feeds from the knowledge database 108. In some embodiments, the artificially intelligent sports companion device 100 obtain the information about the event by using one or more sensors. The one or more sensors may include audio visual sensors. In some embodiments, the processor 106 obtain audio/video feeds relevant to the at least one sporting event from the knowledge database 108. The processor 106 may also acquire information about the event from a user point of view and aggregates all information to determine conversations. In some embodiments, the processor 106 includes a machine learning model that enables the artificially intelligent sports companion device 100 to accompany the user 102 emotionally.

The artificially intelligent sports companion device 100 interacts the conversations with the user 102 through the output module 110 and acquires information from the user 102 on teams or players, the user 102 interested in. The acquired information from the user 102 may be stored in the knowledge database 108. The output module 110 may be any of audio output or video output. In some embodiments, the output module 110 can communicate through one or more expressions in the artificially intelligent sports companion device 100. The one or more expressions may include any of a robot actuator which includes sound, a movement, or an illumination but is not limited by the same. In some embodiments, the output modules express robot actuators when important milestones that are relevant to the team or players or entities the user 102 has expressed interest in has occurred. In some embodiments, the output module 110 communicates the one or more expressions even if the artificially intelligent sports companion device 100 is on OFF condition.

The artificially intelligent sports companion device 100 may include one or more hardware modules and interfaces that are integrated with the processor 106 and can be modeled as any of a body-held digital device or an anthropomorphic device. In some embodiments, the body-held digital device can be a portable held digital device. The artificially intelligent sports companion device 100 may include an artificial intelligence platform to perform collaborative activities of the user 102 with an actual object or a virtual embodiment. The actual object may be a portal robot that is capable of locomotion. In some embodiments, the artificially intelligent sports companion device 100 includes facial arrangement including a screen, and an auditory system that is enabled by an array of microphones.

In some embodiments, the artificially intelligent sports companion device 100 accompanies the user 102 any of a digital sporting event, a physical sporting event, and capturing physical sports playing activity. The artificially intelligent sports companion device 100 enables positive reinforcement and provides emotional support to improve the mood of the user 102, which reduces the chance of depression. In some embodiments, the artificially intelligent sports companion device 100 can be in a form of a portable robot. The portable robot may be any of a drone, a smartwatch, a head camera, or an i-smart glass, that accompanies the user 102 to a live event.

In some embodiments, the artificially intelligent sports companion device 100 detects the user 102 and reminds the user 102 about user-preferred event schedule. The event schedule may be a sport event schedule. The artificially intelligent sports companion device 100 may remind the user 102 with a reminder through the event reminder module 212. The reminder may be any of an audio reminder, a text reminder or a video reminder. In some embodiments, the artificially intelligent sports companion device 100 activates a calendar mode to provide an alert to the user 102 about the event schedule based on the user preferences.

Figure 3:
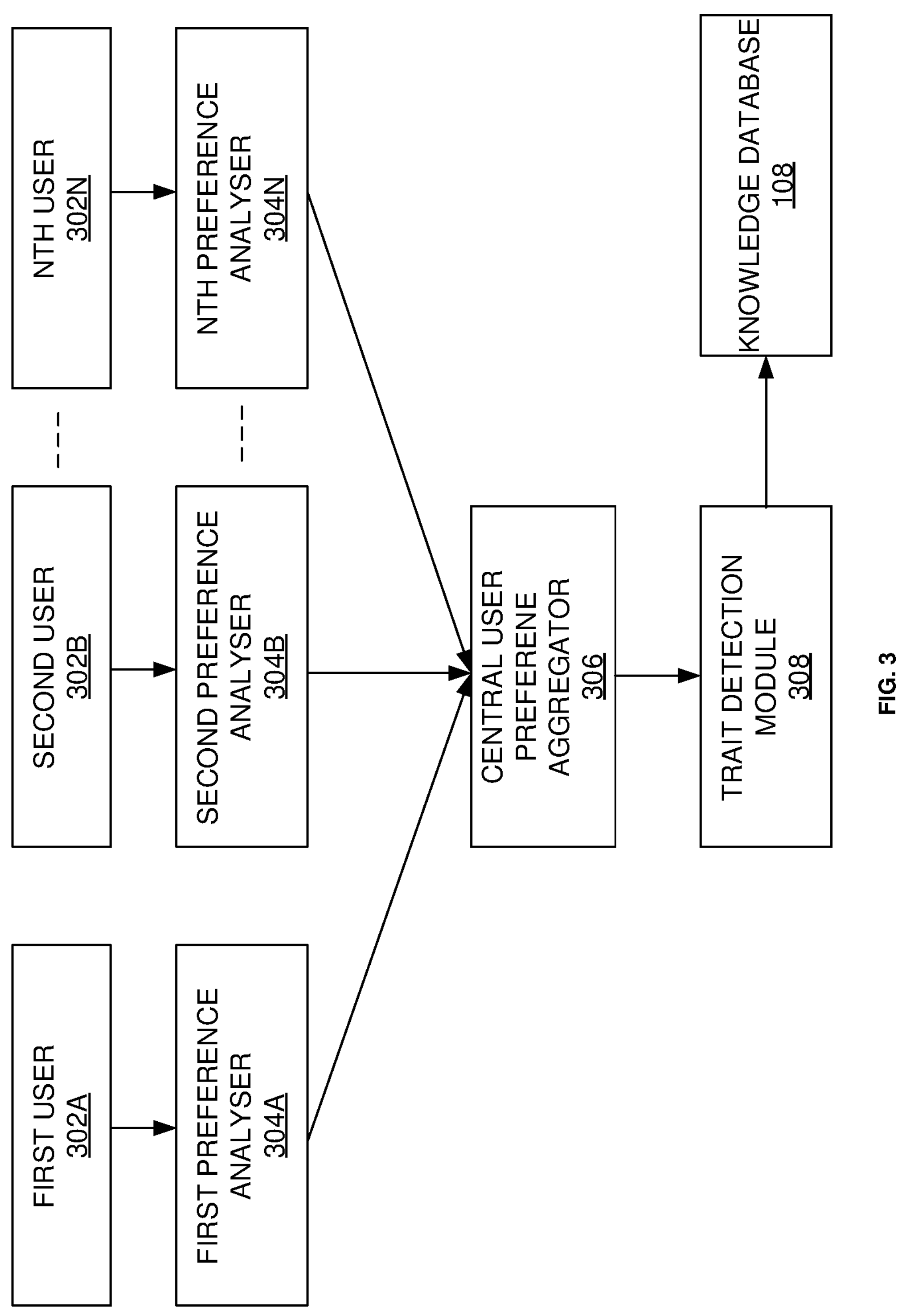
FIG. 3 illustrates a system view of collecting preference information from one or more users according to some embodiments herein.

FIG. 3 illustrates a system view of collecting preference information from one or more users 302A-N according to some embodiments herein. The system view includes the one or more users 302A-N, one or more preference analysers 304A-N, a central user preference aggregator 306, a trait detection module 308, and the knowledge database 108. The preference information can be collected from the one or more users 302A-N with the one or more preference analysers 304A-N, associated with the artificially intelligent sports companion device 100.

The central user preference aggregator 306 receives one or more preferences from the one or more preference analysers 304A-N. The central user preference aggregator 306 enables the trait detection module 308 to classify the one or more users 302A-N into one or more groups based on factors like any of location, gender, age, ethnicity, nationality, behaviour and the like, that enables group behaviour and predict behaviour traits common to at least one group. In some embodiments, the behaviour traits enable a companion mode in the artificially intelligent sports companion device 100 to engage more with the user 102. The artificially intelligent sports companion device 100 may also classify group traits based on sporting seasons. In some embodiments, one or more group separations can be based on at least one of traits, or preferences. The traits may include any of group traits, behaviour traits or seasonal traits. The preferences may include any of the user preferences or seasonal preferences. The one or more group separations may be stored in the knowledge base 108.

The companion mode may be based on the positive event or the negative event that occurs with respect to the user preferences. In some embodiments, degrees of the positive sentiment and the negative sentiment expressed by the user 102 can be observed on the companion mode of the artificially intelligent sports companion device 100. In some embodiments, the artificially intelligent sports companion device 100 assigns different degrees of the positive sentiment and the negative sentiment to one or more sporting entities. The positive sentiment may be the positive emotion and the negative sentiment may be the negative emotion. The artificially intelligent sports companion device 100 exhibits any of the positive emotion and the negative emotion based on degrees of likeness of the user 102.

The artificially intelligent sports companion device 100 may use the predicted behaviour traits to get acquainted with a new user of the artificially intelligent sports companion device 100. In some embodiments, the artificially intelligent sports companion device 100 converses interactively with the user 102. When the user 102 asks queries related to at least one event or activity, the artificially intelligent sports companion device 100 takes the user preferences of the user 102 and seasonal sporting preferences into consideration and continues the conversation with the user 102 based on the user preferences.

The artificially intelligent sports companion device 100 may include an incessant conversation module that initiates conversations with the user 102, considering the user preferences, the seasonal preferences, and the group traits.

The artificially intelligent sports companion device 100 may include a confidant and challenger module to exhibit the sentiments to the user 102. The confidant and challenger module includes a confidant mode and a challenger mode. The artificially intelligent sports companion device 100 may exhibit sentiments conducive to the user 102 in the confidant mode. The artificially intelligent sports companion device 100 may exhibit sentiments opposing the user 102 for a specific event or as desired by the user 102.

Figure 4:
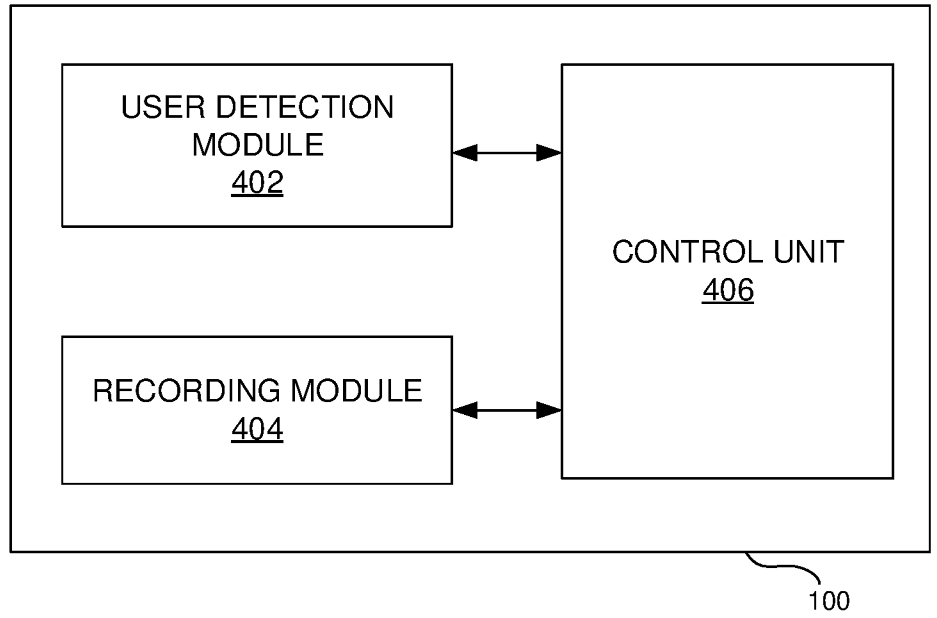
FIG. 4 illustrates a block diagram of the artificially intelligent sports companion device in a capture mode according to some embodiments herein.

FIG. 4 illustrates a block diagram of the artificially intelligent sports companion device 100 in a capture mode according to some embodiments herein. The artificially intelligent sports companion device 100 enables the capture mode when the user 102 is not available to view the event. The artificially intelligent sports companion device 100 includes an user detection module 402, a recording module 404, and a control unit 406. The user detection module 402 detects whether the user 102 is available to view the event. In some embodiments, the user detection module 402 can determine the user 102 is present or not. If the user 102 is not available, the user detection module 402 enables the recording module 404 of the artificially intelligent sports companion device 100 to record the event. The recording module 404 may include a camera to record the event. In some embodiments, the recorded event can be scheduled to play when the user 102 is present. If the user 102 is available, the control unit 406 switches on the smart viewing device to view the event.

In some embodiments, the artificially intelligent sports companion device 100 can be integrated to a smart viewing device of the user 102, and the artificially intelligent sports companion device 100 switches on the smart viewing device when an event preferred by the user 102 is scheduled, when the smart viewing device is on OFF condition. In some embodiments, the smart viewing device can be a smart television system. The artificially intelligent sports companion device 100 may handle a physical control unit of the smart viewing device and switches on and controls the smart viewing device when the event preferred by the user 102 is scheduled. In some embodiments, the artificially intelligent sports companion device 100 can be integrated with a handheld device and includes touch-based activation and visual feedback to navigate to an interactive application broadcasting the event. In some embodiments, the handheld device can be any of a mobile phone or a laptop. The artificially intelligent sports companion device 100 may record the event using one or more storage features on the smart viewing device if the user 102 is not available to view the event.

Figure 5:
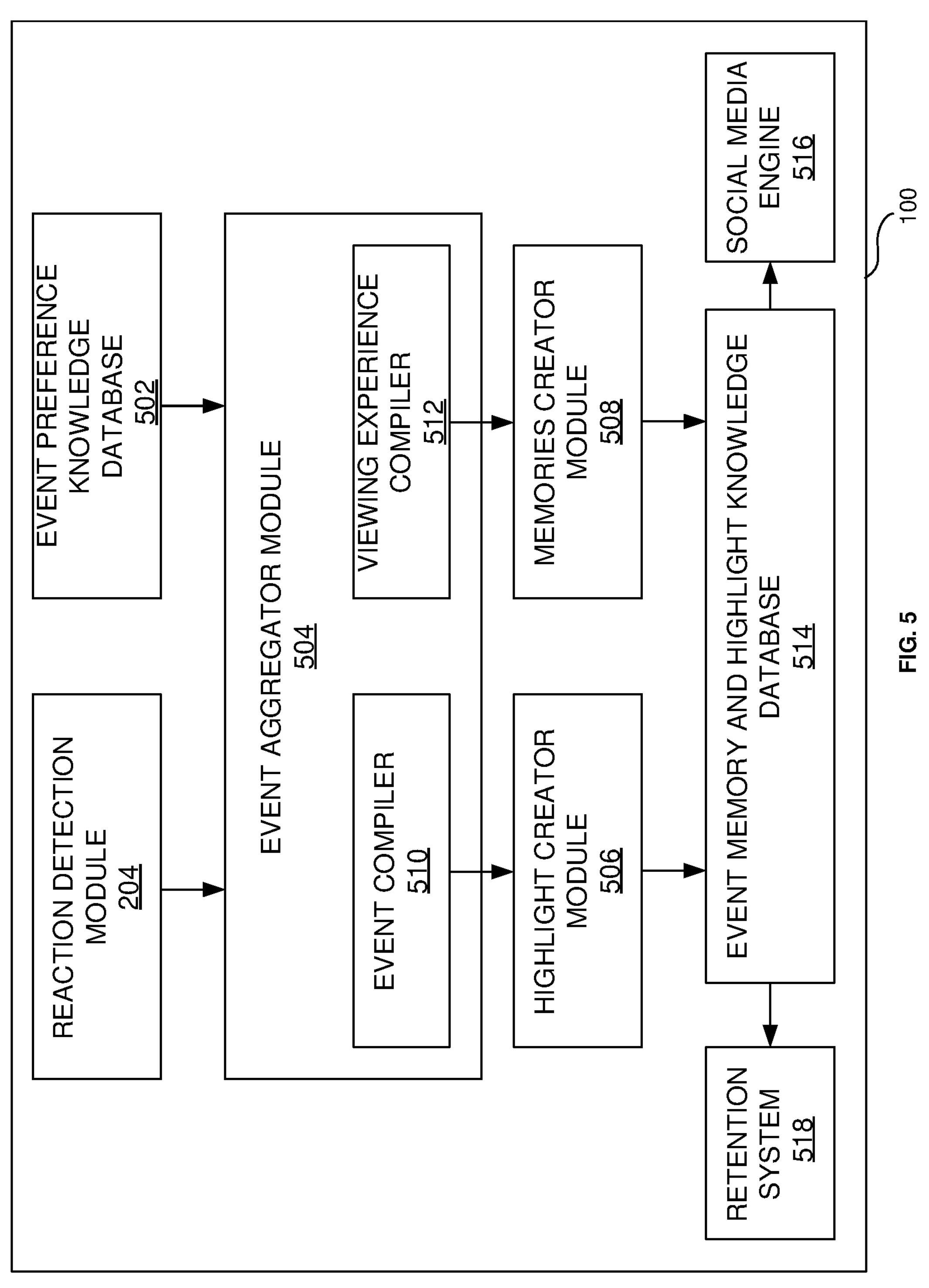
FIG. 5 illustrates a block diagram of the artificially intelligent sports companion device according to some embodiments herein.

FIG. 5 illustrates a block diagram of the artificially intelligent sports companion device 100 according to some embodiments herein. The artificially intelligent sports companion device 100 includes the reaction detection module 204, an event preference knowledge database 502, an event aggregator module 504, a highlight creator module 506, a memories creator module 508, an event memory and highlight knowledge database 514, a social media engine 516, and a retention system 518. The event aggregator module 504 obtains the reactions of the user 102 from the reaction detection module 204 and the user preferences from the event preference knowledge database 502. The event aggregator module 504 includes an event compiler 510 and a viewing experience compiler 512. In some embodiments, the event aggregator module 504 includes a compiler for sporting events and a compiler for sport viewing experience. The artificially intelligent sports companion device 100 may include one or more modes. In some embodiments, the one or more modes include any of a memory mode or a recapitulation mode.

The artificially intelligent sports companion device 100 uses the event compiler 510 to compile visuals of the user preference of a particular event and create highlights of each individual event, when the artificially intelligent sports companion device 100 enables the recapitulation mode. The artificially intelligent sports companion device 100 enables the highlight creator module 506 to create the highlights of the event based on the user preferences and share with the user 102. The artificially intelligent sports companion device 100 uses the viewing experience compiler 512 to compile visuals of user viewing experience and present the visuals in form of memories to the user 102 when the artificially intelligent sports companion device 100 enables the memory mode. The artificially intelligent sports companion device 100 enables the memories creator module 508 to create the visuals of the event based on the user viewing experience. In some embodiments, the artificially intelligent sports companion device 100 enable telepresence mode and activates remote motor capabilities to facilitate community sport viewing experience. The artificially intelligent sports companion device 100 stores the highlights and the memories in the event memory and highlight knowledge database 514.

The artificially intelligent sports companion device 100 is integrated with the social media engine 516 that captures the reactions of the user 102 while viewing the event and sort out key visuals, summarizes with social media platform requirements and shares them in one or more platforms. In some embodiments, the social media engine 516 is configured to capture the reactions of the user 102 while viewing the event, sort out key visuals, and summarizes into at least one of image or text. In some embodiments, the reactions of the user 102 can be emotions of the user 102. The social media engine 516 may generate a post to share in the one or more platforms. The one or more platforms may include any of Whatsapp, Facebook, Twitter, Snapchat, and the like. In some embodiments, the social media engine 516 can be a tweet generator to generate tweets according to the reactions of the user 102. The social media engine 516 may receive the highlights and the memories from the event memory and highlight knowledge database 514. In some embodiments, the social media engine 516 enables the user 102 to review the generated post and share the post in the one or more platforms. The social media engine 516 may generate one or more versions of the post along with an image or a graphics interface file with variations that can be selected by the user 102.

In some embodiments, the retention system 518 includes a memory retention system and a local memory retention system. The retention system 518 may be a storage to store the created memories and the highlights of the event. In some embodiments, the retention system 518 accesses the event memory and highlight knowledge database 514.

The storage of the retention system 518 may be based on a user subscription. The storage may be in a range of 10 GB to 1 TB but is not limited by the same. In some embodiments, the memories can get shorter if the user 102 has not renewed the user subscription. The retention system 518 may keep key memories and erase other memories based on the user preferences. In some embodiments, the duration of the memory is correlated to the pricing plan of the artificially intelligent sports companion device 100. In some embodiments, the retention system 518 fades one or more memories that are not accessed by the user 102 based on the user preferences.

The artificially intelligent sports companion device 100 may capture the feeds if the user 102 is playing the sport and store in the retention system 518. In some embodiments, the artificially intelligent sports companion device 100 enables the user 102 to replay the feeds to review his/her game. In some embodiments, the user 102 can purchase memories of other acquaintance devices at the events.

In some embodiments, the one or more modes include a dream-nightmare mode that is activated when there is no activity or event scheduled in near future. The artificially intelligent sports companion device 100 may generate videos related to the activity based on the user preferences, in the dream mode. The artificially intelligent sports companion device 100 may generate videos related to the activity that is not related to the user preferences, in the nightmare mode.

The artificially intelligent sports companion device 100 may work in a virtual audience mode where the event may be viewed by only the one or more modules and relays of the artificially intelligent sports companion device 100 related to the event live to their human counterparts located remotely. In some embodiments, the user 102 can remotely control and navigate the artificially intelligent sports companion device 100 during the event. In some embodiments, the user 102 can navigate the artificially intelligent sports companion device 100 in the event and interact with humans or other acquaintance devices.

Figure 6:
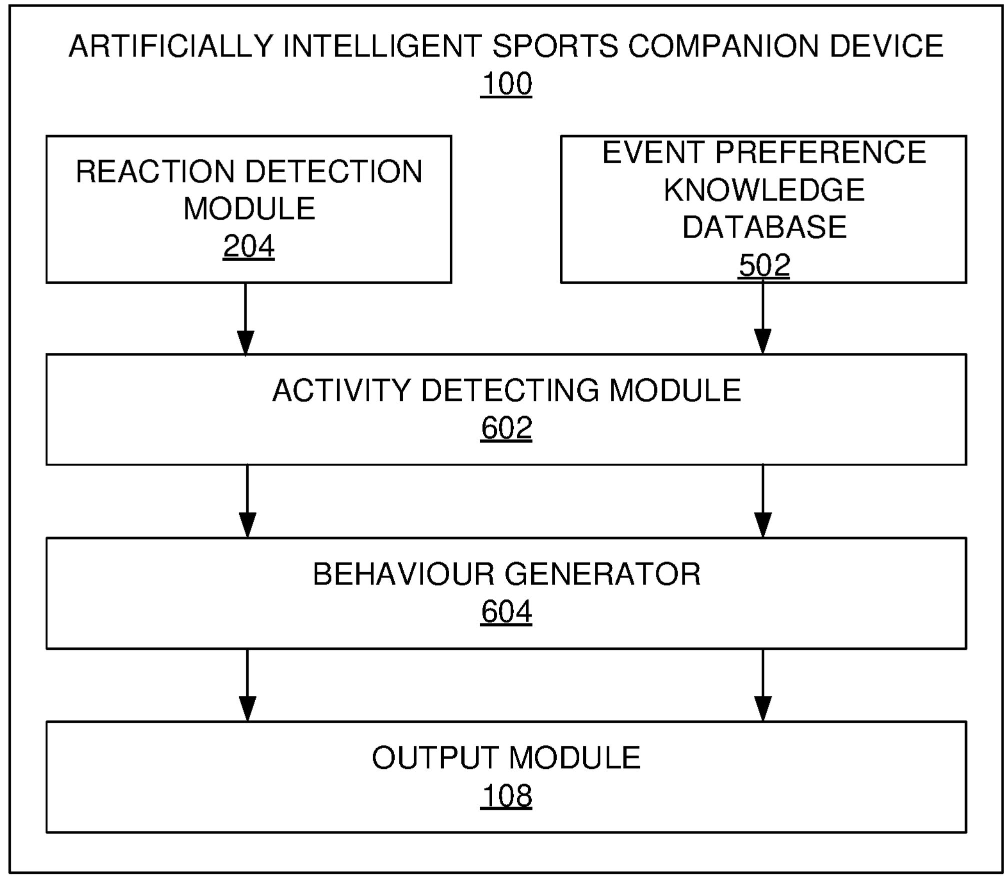
FIG. 6 illustrates a block diagram of the artificially intelligent sports companion device with an activity detecting module according to some embodiments herein.

FIG. 6 illustrates a block diagram of the artificially intelligent sports companion device 100 with an activity detecting module 602 according to some embodiments herein. The artificially intelligent sports companion device 100 includes the reaction detection module 204, the event preference knowledge database 502, the activity detecting module 602, a behaviour generator 604, and the output module 110. In some embodiments, the activity detecting module 602 can be a crowd activity detecting module. In some embodiments, the behaviour generator 604 can be a crowd behaviour generator. The reaction detection module 204 detects the reactions of the user 102, and near-by one or more users 302A-N based on the event preference knowledge database 502. The activity detecting module 602 detects at least one of cheer or applause from the reaction detection module 204 and the event preference knowledge database 502. Based on the at least one of cheer or applause detected on the activity detecting module 602, the behaviour generator 604 generates crowd behaviour output during the event. In some embodiments, the crowd behaviour output can be any of chant, applause, cheer, or disappointment.

In some embodiments, the artificially intelligent sports companion device 100 can be present at a physical venue of any of the activity or the event, and facilitate the user 102 to visualize the ambiance of the physical venue, when the user 102 is in a remote location that is away from the physical venue. In some embodiments, the artificially intelligent sports companion device 100 creates a memory for the event using an event summarization module.

Figure 7:
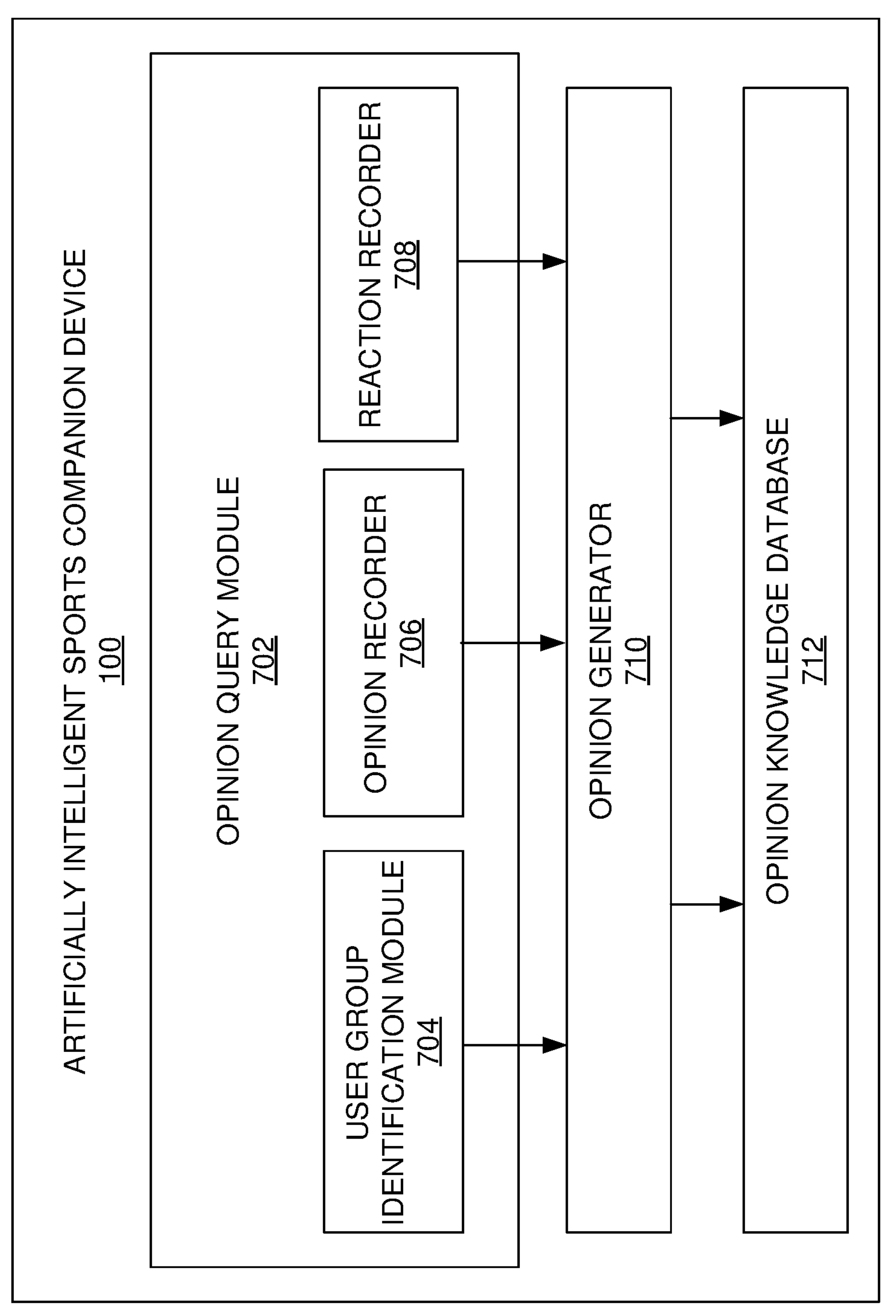
FIG. 7 is a block diagram of the artificially intelligent sports companion device with an opinion query module according to some embodiments herein.

FIG. 7 is a block diagram of the artificially intelligent sports companion device 100 with an opinion query module 702 according to some embodiments herein. The artificially intelligent sports companion device 100 includes the opinion query module 702, an opinion generator 710, and an opinion knowledge database 712. The opinion query module 702 includes a user group identification module 704, an opinion recorder 706, and a reaction recorder 708. The user group identification 704 identifies the user group of the one or more users 302A-N based on the traits. The opinion recorder 706 is configured to capture one or more opinions of the user 102. In some embodiments, the one or more opinions include positive opinions or negative opinions of the user 102. The reaction recorder 708 records the reactions of the user 102 along with the one or more opinions.

The opinion generator 710 receives the user group, the one or more opinions of the user 102, and the reactions of the user 102 to generate the opinions. The opinion generator 710 exhibits opinions of the events to the user 102. In some embodiments, the opinions by the artificially intelligent sports companion device 100 can take either the positive opinion or the negative opinion based on the user preferences. The opinion knowledge database 712 stores the user group, the one or more opinions of the user 102, the reactions of the user 102, and the generated opinion. In some embodiments, the opinion generator 710 an act as a trainer to the user 102 with at least one of the positive opinion or the negative opinion.

Figure 8:
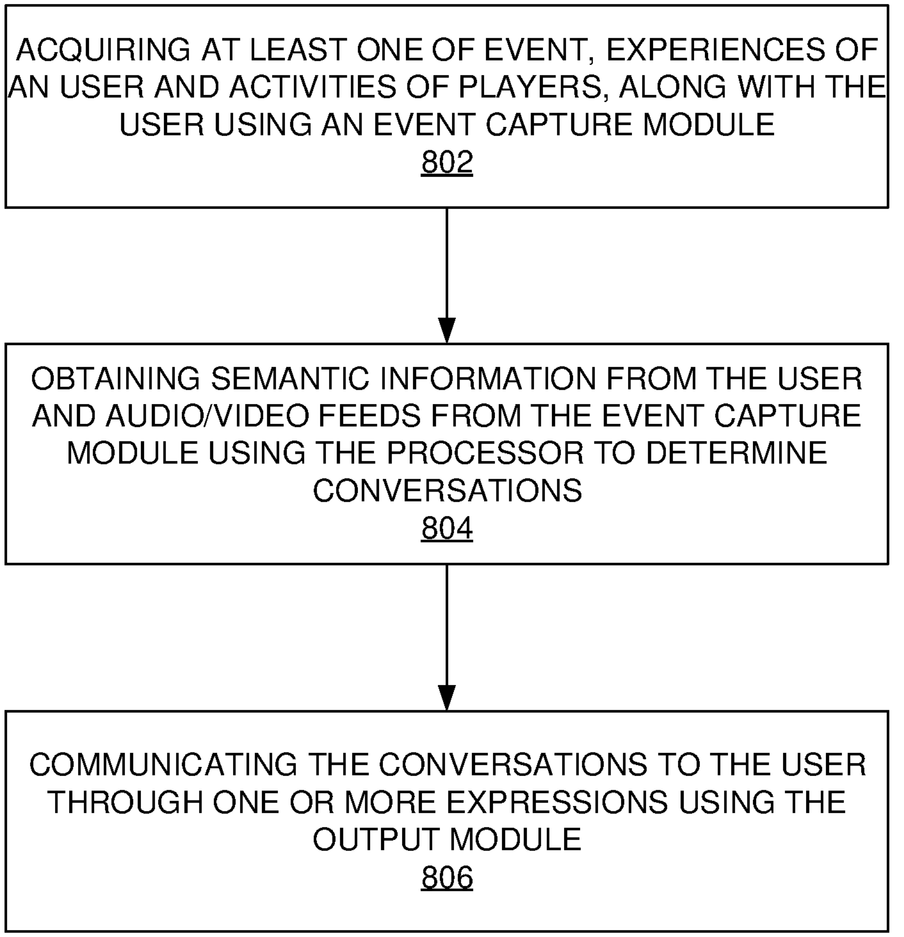
FIG. 8 illustrates a flow diagram of a method of the artificially intelligent sports companion device accompanying the user during one or more events according to some embodiments herein.

FIG. 8 illustrates a flow diagram of a method of the artificially intelligent sports companion device 100 accompanying the user 102 during one or more events according to some embodiments herein. At step 802, the at least one of the event, the experiences of the user 102, and the activities of the players are acquired along with the user 102 using the event capture module 104. At step 804, the semantic information from the user 102 and the audio/video feeds from the event capture module 104, are obtained using the processor 106 to determine the conversations. At step 806, the conversations are communicated to the user 102 through one or more expressions using the output module 110.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. An artificially intelligent sports companion device for grading a user, and correlating one or more reactions and an opinion of the user in relation to at least one event or activity, comprising, a memory to store instructions; and a processor that executes the instructions, wherein the processor is configured to:

capture (i) the at least one of at least one event or activity, experiences of the user, and (ii) one or more activities of a player;

detect one or more milestones when there is a change in (i) the at least one captured event or activity of the user and (ii) the one or more activities of the player, wherein the change in the at least one captured event or activity comprises a rise or drop in the captured event or activity;

determine one or more reactions based on the one or more detected milestones by determining a viewing pattern of the user along with the sentiment and behavior exhibited by the user during the at least one captured event or activity;

identifying the one or more reactions along with the sentiment exhibited by the user during the at least one captured event or activity and correlates it with a team or a player;

measuring grades of the user based on user's measure of liking of a team or a player, wherein the grades of the user are computed based on contents viewed by the user, wherein different grades are assigned to different teams and different players; and determining the one or more reactions with varying sentiments for different durations for different activities, based on the grades of the user, wherein the one or more reactions is provided as input to the processor to predict the user preference;

control one or more robot actuators of the artificially intelligent sports companion device to express varying sentiments with different durations to different activities preferred by the user by performing the one or more determined reactions based on the grades of the user;

obtain semantic information from the user and an information about the at least one captured event or activity from the user using an output unit, and audio/video feeds relevant to the at least one event or activity from a knowledge database;

determine conversations about the at least one event or activity of the user by aggregating at least one of the semantic information from the user, the information about the event or activity from the user, and the audio/video feeds relevant to the at least one event or activity from the knowledge database, to enable companionship to the user;

enable the user to experience the at least one event or activity with the companionship by enabling the one or more robot actuators to initiate the conversations with the user through one or more expressions using the output unit, even when human companions are not available;

capture one or more opinions of the user about the at least one event or activity, comprising a positive or a negative opinion of the user;

record the one or more reactions of the user along with the one or more opinions of the user about the at least one event or activity; and generate an opinion of the at least one event or activity based on a user group of the user, the one or more opinions of the user about the at least one event or activity, and the one or more reactions of the user.

2. The artificially intelligent sports companion device of claim 1, wherein the milestones comprise any of goals being scored, a team winning or losing a match, wickets gone, or centuries scored.

3. The artificially intelligent sports companion device of claim 1, wherein the reactions comprise any of audio/video expression for cheer, audio/video expression for applause, illumination lights, audio/video expression for disappointment, or audio/video expression for anger, based on the detected milestones in the captured event or activity.

4. The artificially intelligent sports companion device of claim 1, wherein the processor is configured to: store audio/video feeds of the one or more events in the knowledge database.

5. The artificially intelligent sports companion device of claim 1, wherein the processor is configured to:

observe a viewing pattern of the user along with sentiment and behavior exhibited by the user;

classify the sentiment exhibited by the user, wherein the classification comprises any of a positive sentiment or a negative sentiment; and save the positive sentiment and the negative sentiment in the knowledge database.

6. The artificially intelligent sports companion device of claim 1, wherein the processor is configured to identify the user group of the user based on his traits, wherein the processor acts as a trainer to the user and employs the opinion of the at least one event or activity to train the user.

7. The artificially intelligent sports companion device of claim 1, wherein the processor is configured to: (i) interact with the user and acquire the information from the user on teams or players; and (ii) enable the one or more robot actuators for communicating the conversations to the user through the one or more expressions, wherein the artificially intelligent sports companion device is integrated with a social media engine that captures the reactions of the user while viewing the at least one event or activity and sort out key visuals, wherein the social media engine is configured to summarize the key visuals of the at least one event or activity, with social media platform requirements and share them in one or more platforms.

8. The artificially intelligent sports companion device of claim 1, wherein the processor is configured to:

create highlights of at least one event or activity by compiling, using an event complier, one or more visuals of user preferences of the at least one event or activity that is acquired or captured along with the user when the artificially intelligent sports companion device enables a recapitulation mode; and create memories of at least one of the activity or the event along with the user by compiling, using a viewing experience complier, one or more visuals of user viewing experience and presenting the one or more visuals in the form of memories to the user when the artificially intelligent sports companion device enables a memory mode.

9. A method for grading a user, and correlating one or more reactions and an opinion of the user in relation to at least one event or activity for providing companionship to the user, even when human companions are not available, wherein the method comprises, capturing (i) the at least one of at least one event or activity, experiences of the user (102), and (ii) one or more activities of a player;

detecting one or more milestones when there is a change in (i) the at least one captured event or activity of the user and (ii) the one or more activities of the player, wherein the change in the at least one captured event or activity comprises a rise or drop in the captured event or activity;

determining one or more reactions based on the detected milestones by determining a viewing pattern of the user along with the sentiment and behavior exhibited by the user during the at least one captured event or activity;

identifying the one or more reactions along with the sentiment exhibited by the user during the at least one captured event or activity and correlates it with a team or a player;

measuring grades of the user based on user's measure of liking of a team or a player, wherein the grades of the user are computed based on contents viewed by the user, wherein different grades are assigned to different teams and different players; and determining the one or more reactions with varying sentiments for different durations for different activities, based on the grades of the user, wherein the one or more reactions is provided as input to the processor to predict the user preference;

controlling one or more robot actuators of the artificially intelligent sports companion device to express varying sentiments with different durations to different activities preferred by the user by performing the one or more determined reactions based on the grades of the user;

obtaining semantic information from the user and an information about the at least one captured event or activity from the user using an output unit, and audio/video feeds relevant to the at least one event or activity from a knowledge database;

determining conversations about the at least one event or activity of the user by aggregating at least one of the semantic information from the user, the information about the event or activity from the user, and the audio/video feeds relevant to the at least one event or activity from the knowledge database, to enable companionship to the user;

enabling the user to experience the at least one event or activity with the companionship by enabling the one or more robot actuators to initiate the conversations with the user (102) through one or more expressions using the output unit, even when human companions are not available;

capturing one or more opinions of the user about the at least one event or activity, comprising a positive or a negative opinion of the user;

recording the one or more reactions of the user along with the one or more opinions of the user about the at least one event or activity; and generating an opinion of the at least one event or activity based on a user group of the user, the one or more opinions of the user about the at least one event or activity, and the one or more reactions of the user.

* * * * *